UNITED STATES PATENT OFFICE.

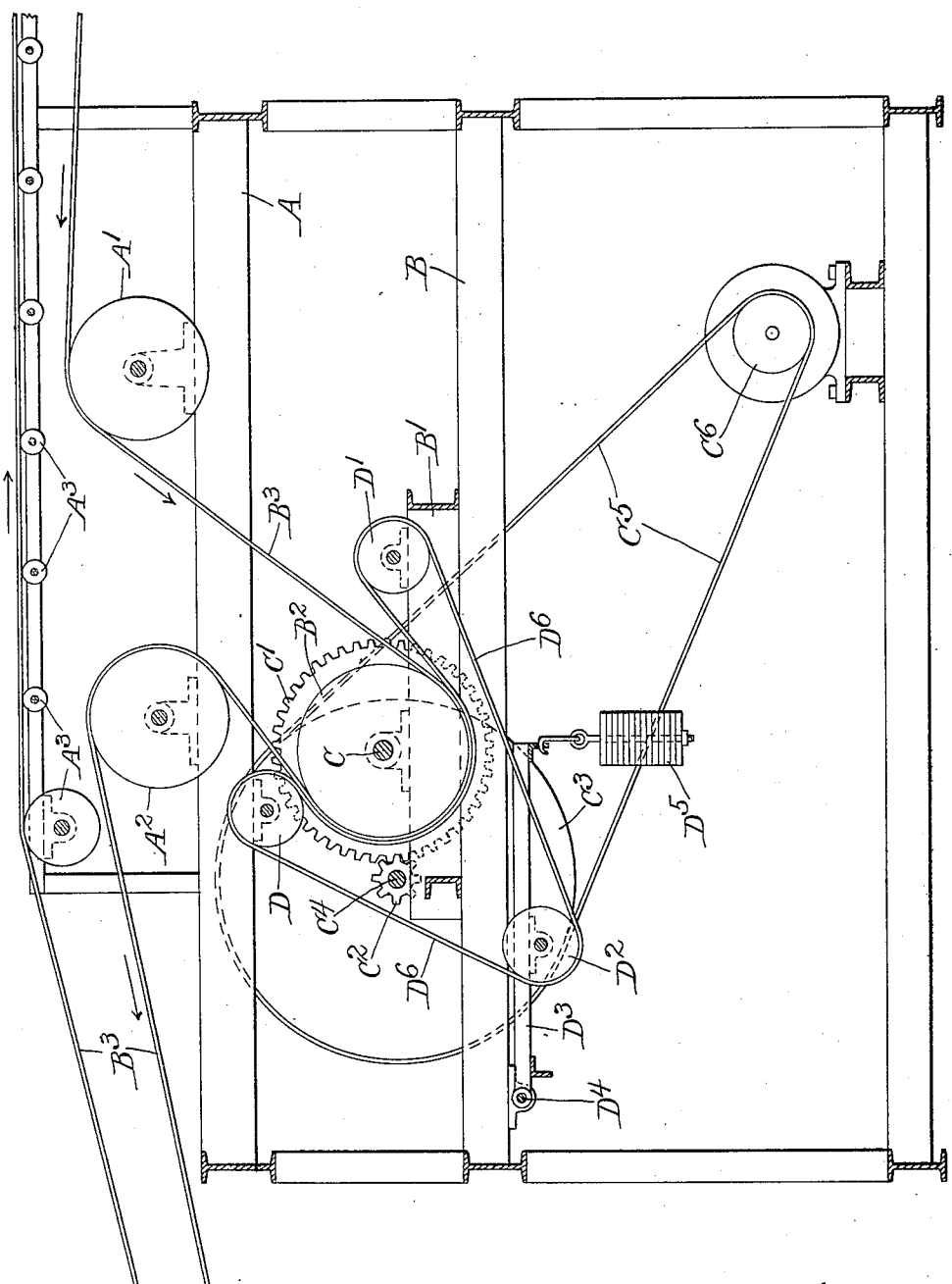

CHARLES PIEZ, OF CHICAGO, ILLINOIS, ASSIGNOR TO LINK-BELT COMPANY, OF CHICAGO, ILLINOIS, A CORPORATION OF ILLINOIS.

CONVEYER-BELT DRIVE.

1,319,109.                Specification of Letters Patent.      Patented Oct. 21, 1919.

Application filed September 27, 1917. Serial No. 193,474.

*To all whom it may concern:*

Be it known that I, CHARLES PIEZ, a citizen of the United States, residing at Chicago, in the county of Cook and State of Illinois, have invented a certain new and useful Improvement in Conveyer-Belt Drives, of which the following is a specification.

My invention relates to improvements in driving means for conveyer belts and has for one object to provide a means whereby loss of power through slippage of the conveyer belt about its driving pulley may be prevented without an increase in the tension of the main conveyer belt. Other objects will appear from time to time in the specification.

My invention is illustrated more or less diagrammatically in the accompanying drawing wherein is shown a side elevation of the driving and controlling means of a conveyer belt with my invention applied.

A is a part of a belt conveyer runway frame. It carries two terminal pulleys $A^1$ $A^2$ and a plurality of belt supporting pulleys $A^3$ $A^3$.

B is a driving gear supporting frame carried by the frame A. Mounted on it is a sub-frame $B^1$. $B^2$ is a belt driving pulley mounted on the sub-frame $B^1$. $B^3$ is a flat, broad, smooth, flexible conveyer belt adapted to travel around the driving pulley $B^2$ and the terminal pulleys $A^1$ and $A^2$ and to travel along and be supported by the pulleys $A^3$.

C is the shaft upon which the pulley $B^2$ is mounted. Mounted rigidly upon it is a driving gear $C^1$ in mesh with a driving pinion $C^2$ on the frame $B^1$. $C^3$ is a belt wheel on the shaft $C^4$ which shaft also carries the pinion $C^2$. $C^5$ is a driving belt adapted to travel around the pulley $C^3$ and to be driven by a pulley $C^6$ which in turn is driven by any suitable motor or power source not here specifically illustrated.

D, $D^1$ are fixed idler pulleys mounted one of them upon the frame A, the other upon the frame $B^1$. They are located each of them adjacent the line traveled by the conveyer belt $B^3$ as it travels between the pulley $B^2$ and $A^1$ and the pulley $B^2$ and $A^2$. $D^2$ is an adjustable idler pulley mounted on the lever $D^3$. This lever is pivoted at $D^4$ and carries at its free end an adjustable weight $D^5$. $D^6$ is an idler belt passing around the pulleys D, $D^1$ and $D^2$ and having a loop substantially U-shaped where it passes around the back side of the pulley $B^2$ bearing against the outer surface of the conveyer belt $B^3$.

It will be evident that while I have shown in my drawings an operative device still many changes might be made both in size, shape and arrangement of parts without departing materially from the spirit of my invention and I wish, therefore, that my drawings be regarded as in a sense diagrammatic.

The use and operation of my invention are as follows:—

The apparatus is set up as shown. Under come conditions the friction of the smooth belt on the smooth driving pulley will be sufficient to furnish sufficient driving power without slippage of the pulley. If the conveyer belt is heavily loaded, however, the friction between it and the driving pulley must be increased. Ordinarily this is increased by increasing the tension in the driving belt. It is, of course, well known that an increase in the tension of the belt very rapidly decreases the life of the belt and since these long conveyer belts are exceedingly expensive anything decreasing their life is very disadvantageous. Moreover, an increase in the tension increases the load on the supporting pulleys and their bearing and adds materially to the cost of their upkeep.

I provide means for increasing the friction not by increasing the tension of the belt but by merely increasing the pressure of the belt against the driving pulley. It will be noted that the smooth idler belt with the U shaped loop surrounding the driving pulley and engaging the outside of the conveyer belt, is a cheap, short, small belt. There is no particular objection to running this idler belt under very high tension because when it wears out another cheap belt can be substituted. I, therefore, carry a heavy load on the end of the tightening lever and this tightens this belt around the driving pulley and holds the conveyer belt rigidly against the surface of the driving pulley. This gives the desired increase in frictional resistance and the only pulley bearing that is affected is the one driving pulley bearing which is easy to get at and easy to keep in shape.

It will be noted that the conveyer belt is smooth, that the idler belt is absolutely smooth and that the driving pulley is smooth. There is thus no bending of any of the parts, no unequal straining of any of the parts and no chattering or variation in load. The work is done by merely increasing the frictional resistance which tends to prevent slipping of the belt on the surface of the driving pulley. Obviously the driving pulley must be substantially flat because while the conveyer belt itself may be troughed where it carries the load it must not be troughed anywhere where it can be avoided and the flatter the pulley subject only to the necessity of keeping the belt on it, the better for the conveyer belt. Moreover, where you are carrying heavy loads if you have a sharply crowned pulley or a grooved pulley the peripheral velocities of the pulley at different points of contact with the belt will be different and the belt will be worn away by the slippage whereas if the pulley is cylindrical or substantially cylindrical there will be a constant pushing power applied by the pulley to the belt all the way along its length without any slipping and without any wearing away of the belt.

If you have a rough or irregular pulley or a belt having rough or irregular surfaces on it there will be slippage and jumping from time to time owing to the fact that the irregularities will not come in a mesh with each other and owing to the fact that air is likely to be included between the belt and the pulley and hold them apart. The smooth contact surface with the tight idler belt squeezing the driving pulley against the conveyer belt prevents any separation of the two friction surfaces, makes the inclusion of air impossible and makes it impossible for the centrifugal force always more or less present and tending to hold the belt off the pulley to reduce the friction unduly.

I claim:—

1. The combination with a flat, smooth, continuous flexible working belt of a substantially cylindrical smooth frictional driving pulley about which the belt travels, a flat smooth idler belt traveling about the driving pulley and means for exerting a tension therein to compress the working belt against the driving pulley and increase the frictional resistance between the driving pulley and the working belt.

2. The combination with a flat, smooth, continuous flexible working belt of a substantially cylindrical smooth frictional driving pulley about which the belt travels, a flat smooth idler belt traveling about the driving pulley and means for exerting a tension therein to compress the working belt against the driving pulley and increase the frictional resistance between the driving pulley and the working belt, the working belt being in contact with the pulley at all points without interruption from the place where it first comes in contact with the pulley to the place where it leaves it.

3. The combination with a flat, smooth, continuous flexible working belt of a substantially cylindrical smooth frictional driving pulley about which the belt travels, a flat smooth idler belt traveling about the driving pulley and means for exerting a tension therein to compress the working belt against the driving pulley and increase the frictional resistance between the driving pulley and the working belt, the idler belt being arranged in a U-shaped loop and adapted to encircle not less than half the driving pulley.

4. The combination with a flat, smooth, continuous flexible working belt of a substantially cylindrical smooth frictional driving pulley about which the belt travels, a flat smooth idler belt traveling about the driving pulley and means for exerting a tension therein to compress the working belt against the driving pulley and increase the frictional resistance between the driving pulley and the working belt, the working belt being in contact with the pulley at all points without interruption from the place where it first comes in contact with the pulley to the place where it leaves it, the idler belt being arranged in a U-shaped loop and adapted to encircle not less than half the driving pulley.

5. In a belt conveyer two adjacent terminal pulleys, a working belt traveling over them having a loop extending down between them, a driving pulley in said loop at one side of the path of the body of the working belt, an idler belt traveling about the driving pulley in engagement with the working belt, and idler pulleys about which such idler belt travels located one adjacent each side of the driving pulley and between it and one of the terminal pulleys and means for exerting a tension in such idler belt.

6. The combination with a flat, smooth, continuous flexible working belt, of a substantially cylindrical smooth frictional driving pulley about which the belt travels, an idler belt traveling about the driving pulley and means for exerting a tension therein to compress the working belt against the driving pulley and increase the frictional resistance between the driving pulley and the working belt.

7. The combination with a flat, smooth, continuous flexible working belt, of a substantially cylindrical smooth frictional driving pulley about which the belt travels, and means adapted to engage the outer surface of the working belt about approximately half of the circumference of the driving pulley and compress it against the driving pulley to increase the frictional resistance between the driving pulley and the working belt independent of the tension in the belt.

8. The combination with a flat, smooth, continuous flexible working belt, of a substantially cylindrical smooth frictional driving pulley about which the belt travels, and means adapted to engage the outer surface of the working belt about approximately half of the circumference of the driving pulley and compress it against the driving pulley to increase the frictional resistance between the driving pulley and the working belt, said means being at all times in positive engagement with that surface of the working belt farthest away from the driving pulley as the belt passes thereover and independent of the tension of the belt.

9. The combination with a flat smooth continuous flexible working belt of a substantially cylindrical smooth frictional driving pulley about which the belt travels, and whereby it is driven, and means for applying pressure to the belt opposite its whole contact surface with the pulley to increase the frictional resistance between the driving pulley and the working belt without increasing the tension on the belt.

10. The combination with a smooth continuous flexible working belt of a smooth frictional driving pulley about which the belt travels, and whereby it is driven, and means for applying pressure to the belt opposite its whole contact surface with the pulley to increase the frictional resistance between the driving pulley and the working belt without increasing the tension on the belt.

11. The combination with a flat, smooth, continuous flexible working belt of a substantially cylindrical smooth frictional driving pulley about which the belt travels, and means adapted to engage the outer surface of the working belt over more than half of the circumference of the driving pulley and compress it against the driving pulley to increase the frictional resistance between the driving pulley and the working belt.

In testimony whereof, I affix my signature in the presence of two witnesses this 24 day of September 1917.

CHARLES PIEZ.

Witnesses:
W. W. SAYERS,
E. O. WILLIAMS.

Copies of this patent may be obtained for five cents each, by addressing the "Commissioner of Patents, Washington, D. C."